United States Patent
Gasiba et al.

(10) Patent No.: US 12,332,863 B2
(45) Date of Patent: Jun. 17, 2025

(54) METHOD AND APPARATUS FOR TRUSTWORTHY PROVISION OF DATA ELEMENTS AND METHOD FOR CHECKING A DATASET WITH A PLURALITY OF DATA ELEMENTS

(71) Applicant: Siemens Healthineers AG, Forchheim (DE)

(72) Inventors: Tiago Gasiba, Munich (DE); Jorge Ricardo Cuellar Jaramillo, Baierbrunn (DE); Santiago Reinhard Suppan, Maxhuette-Haidhof (DE)

(73) Assignee: Siemens Healthineers AG, Forchheim (DE)

( * ) Notice: Subject to any disclaimer, the term of this patent is extended or adjusted under 35 U.S.C. 154(b) by 0 days.

(21) Appl. No.: 18/327,261

(22) Filed: Jun. 1, 2023

(65) Prior Publication Data
US 2023/0394022 A1    Dec. 7, 2023

(30) Foreign Application Priority Data
Jun. 3, 2022   (DE) ............... 10 2022 205 719.8

(51) Int. Cl.
G06F 17/30   (2006.01)
G06F 16/22   (2019.01)
G06F 21/31   (2013.01)

(52) U.S. Cl.
CPC .......... *G06F 16/2246* (2019.01); *G06F 21/31* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| 11,615,813 B1* | 3/2023 | Goker ................. G11B 20/182 714/699 |
| 2002/0188843 A1 | 12/2002 | Kocher |
| 2005/0235154 A1* | 10/2005 | Serret-Avila ............ G06F 21/53 713/176 |

(Continued)

FOREIGN PATENT DOCUMENTS

| EP | 3726412 B1 | 4/2022 |
| WO | WO 9743842 A1 | 11/1997 |

OTHER PUBLICATIONS

Rannenberg K. et al.:"Attribute-based Credentials for Trust", Springer Link Book 2015, https://link.springer.com/book/10.1007/978-3-319-14439-9.

(Continued)

*Primary Examiner* — Hung D Le
(74) *Attorney, Agent, or Firm* — Harness, Dickey & Pierce, P.L.C.

(57) ABSTRACT

Methods and apparatuses relate to transferring user-specific data that can be validated via a hash tree. If not all of the underlying data of the hash tree is transferred, then in place of the non-transferred data, a suitable hash value from the hash tree can be transferred. The data to be transferred includes at least one reference data element which is suitable for checking the authenticity of the sender.

18 Claims, 3 Drawing Sheets

(56) References Cited

U.S. PATENT DOCUMENTS

| | | | | |
|---|---|---|---|---|
| 2008/0028224 | A1* | 1/2008 | Pitsos | H04L 9/3236 713/176 |
| 2010/0153732 | A1* | 6/2010 | Su | H04L 9/3236 713/176 |
| 2010/0212017 | A1* | 8/2010 | Li | G06F 21/645 726/26 |
| 2011/0283085 | A1* | 11/2011 | Dilger | G06F 11/1004 711/216 |
| 2012/0078864 | A1* | 3/2012 | Li | H04N 21/8358 707/E17.007 |
| 2014/0046909 | A1* | 2/2014 | Patiejunas | G06F 16/24554 707/687 |
| 2016/0147651 | A1* | 5/2016 | Desai | G06F 11/1004 711/103 |
| 2016/0241574 | A1* | 8/2016 | Kumar | H04L 63/12 |
| 2016/0379013 | A1* | 12/2016 | Ganesan | G06F 21/645 713/176 |
| 2022/0109557 | A1* | 4/2022 | Venkatesh | H04L 9/50 |
| 2022/0179998 | A1* | 6/2022 | Lamplmair | H04L 63/123 |
| 2022/0414260 | A1 | 12/2022 | Latka et al. | |

OTHER PUBLICATIONS

Wang, Jianfeng et al: Verifiable auditing for outsourced database in cloud computing. In: IEEE transactions on computers, vol. 64, 2015, Nr. 11, S. 3293-3303. IEEE Xplore [online]. 001: 10.1109/TC.2015.2401036 In: IEEE.

Modersheim S. et al: "TPL A Trust Policy", IFIPTM 2019: Trust Management XIII pp. 209-223.

Alber L. et al.:"Adapting the TPL Trust Policy Language for a Self-Sovereign Identity World", : Open Identity Summit 2021.

Pang, Hweehwa Et La., Scalable verification for outsourced dynamic databases. In: Proceedings of the VLDB Endowment, vol. 2, 2009, Nr. 1, S. 802-813. 001: 10.14778/1687627.1687718.

* cited by examiner

METHOD AND APPARATUS FOR TRUSTWORTHY PROVISION OF DATA ELEMENTS AND METHOD FOR CHECKING A DATASET WITH A PLURALITY OF DATA ELEMENTS

CROSS-REFERENCE TO RELATED APPLICATION(S)

The present application claims priority under 35 U.S.C. § 119 to German Patent Application No. 10 2022 205 719.8, filed Jun. 3, 2022, the entire contents of which are incorporated herein by reference.

FIELD

One or more embodiments of the present invention relate to a method and/or an apparatus for trustworthy provision of data elements, and/or a method for checking a dataset with a plurality of data elements.

BACKGROUND

In the context of increasing digitalization, digital documents and digital processes are continuously gaining greater significance. In this regard, it is also required to sign digital documents in order to be able to ensure the trustworthiness of the content of such documents. Herein, via the digital signature, the identity of the creator and/or the processor of such a document can be checked.

Such a signature can possibly comprise a plurality of data elements. The individual data elements can therein each specify particular information items or properties of a user. Thus, the data elements can comprise, for example, first name, surname, date of birth, address, business of the user, position of the user in the business and/or many other information items.

From all this information, for example, a so-called hash tree or Merkle tree can be formed. Herein, initially a hash value is formed for each data element. Subsequently, from two or more of these hash values, a further hash value which forms a node element of the hash tree can be formed in each case. The uppermost hash value of this hash tree is designated a root or a root node. On the basis of the value of this root node, the individual data elements can thus be checked.

Depending on the application case, a user cannot reveal all this information. If, however, not all the data elements are available for checking, then no checking can take place on the basis of the root node of such a hash tree.

It is therefore desirable to create a check of data elements on the basis of a hash tree, which also enables a reliable check even on a merely partial transference of data elements.

SUMMARY

One or more embodiments of the present invention relate to a method and/or an apparatus for trustworthy provision of data elements, and/or a method for checking a dataset with a plurality of data elements having the features of at least the independent claims. Further advantageous embodiments are the subject matter of the dependent claims.

According to one aspect, a method for trustworthy provision of data elements is provided. The method comprises a step for providing a plurality of data elements. The plurality of data elements therein comprise at least one reference data element. This reference data element is suitable for validating an identity of a user. In addition, the method comprises a step for calculating hash values for the plurality of data elements provided. Furthermore, the method comprises a step of creating a hash tree. The calculated hash values of the data elements provided therein form the leaves of the hash tree. Furthermore, the method comprises a step of selecting a subset of the data elements provided. The subset of the data elements provided therein comprises the at least one reference data element. The method further comprises a step for creating a dataset which comprises the selected data elements, a hash value of the root of the hash tree and hash values of the hash tree, which have been formed from the non-selected data elements. Finally, the method can comprise a step for outputting the created dataset.

According to a further aspect, an embodiment of the present invention provides an apparatus for trustworthy provision of data elements. The apparatus is designed
  to receive a plurality of data elements and store them in a memory store of the apparatus, wherein the plurality of data elements comprise at least one reference data element which is suitable for validating an identity of a user;
  to calculate hash values for the plurality of data elements provided;
  to create a hash tree, wherein the calculated hash values of the data elements provided form the leaves of the hash tree;
  to select a subset of the data elements provided, wherein the subset of the data elements provided comprises the at least one reference data element;
  to create a dataset which comprises the selected data elements, a hash value of the root of the hash tree and hash values of the hash tree, which have been formed from the non-selected data elements; and
  to output the created dataset.

According to a further aspect, an embodiment of the present invention creates a method for checking a dataset with a plurality of data elements. This method comprises a step for receiving a dataset with selected data elements, a hash value of the root of a hash tree and hash values of the hash tree, which have been formed from the non-selected data elements. The selected data elements comprise at least one reference data element which is suitable for validating an identity of a user. The method further comprises a step for checking the selected data elements using the received hash values of the selected data elements, the hash value of the root of the hash tree and the hash values of the hash tree, which have been formed from the non-selected data elements. Finally, the method comprises a step for verifying the reference data element.

The knowledge underlying one or more embodiments of the present invention is that with increasing digitalization, the checking of digital data elements is also gaini-ng crucial importance. However, a digital signature can comprise a plurality of individual data elements. A user does not always wish to reveal the information in all these data elements to a recipient. Depending upon the application, the user may possibly wish to disclose only a part of the data elements contained in the signature to the recipient. Therein, the selection of the data elements to be disclosed can vary according to the application case or the recipient.

It is therefore desirable to create a simple, flexible but nevertheless reliable and trustworthy possibility for being able to select user-specific data elements individually in relation to third parties and to provide them in a checkable form.

For this purpose, it is provided, according to embodiments of the present invention, to make the entirety of the data elements, such as the individual data elements for specifying a user to be checkable via a so-called hash tree or Merkle tree, for instance. Herein, initially an individual hash value is formed for each data element. A plurality of these hash values can then together form a node of the hash tree. This concept can be continued until, at the end, a single root node is formed. Thus, on the basis of the value of this root node, the entirety of the individual data elements can then be checked.

In order herein to enable a checking of only a subset of the data elements, it is further provided, according to embodiments of the present invention, aside from the data elements provided on the receiving/checking side, also to provide hash values of nodes of the hash tree which do not belong to the transferred data elements. In other words, in place of some of the data elements, hash values of these individual data elements or nodes of the hash tree which are formed from these data elements can also be provided for checking. Thus it is no longer required, for the checking of the data elements provided, to make use of the entirety of all the data elements.

Furthermore, according to embodiments of the present invention, the trustworthiness and checkability of the transferred data can be increased in that the dataset with the data elements to be checked comprises at least one data element designated the reference data element. This reference data element is suitable for checking the identity of the respective user. As described in detail below, a reference data element of this type can relate, for example, to a public key of a user. Via such a public key, for example, signatures of data which has been signed via a corresponding private key of the user can be checked.

If the transferred subset of the user-specific data elements comprises such a reference data element, then firstly initially using the root hash value and the further transferred hash values of the hash tree, the integrity of the transferred data can be checked. In addition, using the obtained reference data elements, it can additionally be checked that the data actually originates from the expected user. In this way, the trustworthiness of the data can thus be increased, even if a user wishes to reveal only a subset of the user-specific actions of a hash tree.

For the calculation of hash values of the data elements and of the nodes of the hash tree, in principle, any suitable hash algorithm can be used. By this mechanism and/or means, from an original value of the data element, a hash data element with a predetermined size can typically be calculated. This calculation is typically not reversible, i.e. although the hash value can be calculated from the data element via the hash algorithm, the original data element cannot be deduced from the hash value. As hash functions, for example, the SHA-2 and SHA-3 families of secure hash algorithm (SHA) or other secure hash functions are possible.

According to one embodiment, the reference data element can comprise a public key of a user. For this purpose, in principle, any public keys of a private-public key concept are possible. Herein, for example, a public key can be shared with a user. If an arbitrary data element is signed with a private key corresponding to the public key, thereupon, this signature can be checked making use of the public key. Accordingly, therefore, using the public key as a reference data element, an authentication of the user can take place in that the user is requested to sign a data element which thereupon is checked via the public key in the reference data element.

According to one embodiment, the created dataset comprises details regarding the positions of the hash values in the hash tree. In other words, at least for the hash values which are transferred in place of data elements of the hash tree, in the dataset provided is specified to which position in the hash tree each hash value belongs. For this purpose, in principle, any desired data structure can be used. For example, an item of information can be attached to each transferred item, placed for example before or after it, which specifies, in each case, the position of the corresponding hash value in the hash tree.

According to one embodiment, the outputting of the created dataset takes place in a predetermined data structure. Via such a data structure, in particular, the positions of the hash values in the hash tree can be specified. For example, if a data structure of this type has been agreed in advance between a sender and a receiver, then purely on the basis of this specific data structure, it can be established in each case to which position in the hash tree each transferred hash value corresponds.

According to one embodiment, the created dataset is output in an XML or JSON format. Such XML and JSON formats are very well suited for the specification of all the relevant data as provided for transferring datasets with partially transferred data elements. Furthermore, however, in principle any other suitable data formats are also possible.

According to one embodiment, the hash tree is constructed as a binary tree. In such a binary tree, two data elements and/or hash values are combined to a hash value of a higher-level node. Such hash trees can be formed particularly efficiently. In addition, however, hash trees are also in principle possible in which more than two data elements or hash values can be combined to a higher-level node.

According to one embodiment, the calculation of the hash values for the plurality of data elements provided and the hash tree comprises a step for determining a modification value for a node of the hash tree, wherein the modification value depends upon the position of the node and a previously stipulated value. Furthermore, the calculation of the hash values comprises a step for modifying the value of a node using the original node value and the corresponding modification value. Finally, the hash value for the modified value of the node can be calculated. Via such a modification and/or enhancement of a value for a data element or a node value, the security can additionally be enhanced. Thus, in particular for data elements, the content of which can originate only from a relatively small quantity of possible values, a greater complexity and therefore security can also be achieved. If, for example, a data element comprises the specification of a month, then it can be assumed that only 12 values are possible for this. Thus, if relevant, via a brute force attack, the original value could very easily be deduced. Via an additional enhancement or mixing with a further modification value, a higher level of complexity is obtained which makes such an attack more difficult or even completely impossible.

According to one embodiment, for different receivers, modification values can be determined in each case with different previously stipulated values. In this way, different receivers cannot compare the data made available to them with data from further receivers in order possibly to draw conclusions therefrom regarding data elements not made available to the original receiver.

According to one embodiment, a user can select individual data elements, for example via a user interface or similar which are to be made available to a respective receiver from the totality of the data elements. Thereupon, in place of the non-selected data elements, as previously already described, in each case hash values from the hash tree can be transferred.

According to a further aspect, embodiments of the present invention relate to a computer program which comprises instructions that, when the program is executed by a computer or the apparatus as described above, cause the computer or the apparatus to execute the method according to embodiments of the present invention and their aspects.

According to a further aspect, embodiments of the present invention relate to a non-transitory computer-readable medium which comprises instructions that, when they are executed by a computer or the apparatus as described above, cause the computer or the apparatus to execute the method according to embodiments of the present invention and their aspects.

The realization of embodiments of the present invention by a non-transitory computer program product and/or a non-transitory computer-readable medium has the advantage that already existing computers or apparatuses can be easily adapted by software updates in order to operate as proposed by embodiments of the present invention.

The computer program product can be or comprise, for example, a computer program or another element external to the computer program. This other element can be hardware, for example, a storage apparatus on which the computer program is stored, a hardware key for using the computer program and suchlike and/or software, for example, documentation or a software key for using the computer program.

The above embodiments and developments can be combined with one another as desired, if useful. Further embodiments, developments and implementations of the present invention also include not explicitly mentioned combinations of features of the present invention described above or below in relation to the exemplary embodiments. In particular, a person skilled in the art would also draw upon individual aspects as improvements or enhancements to the respective basic forms of the present invention.

BRIEF DESCRIPTION OF THE DRAWINGS

Further features and advantages of the present invention are explained below, making reference to the drawings. In the drawings.

DETAILED DESCRIPTION

Figure 1:
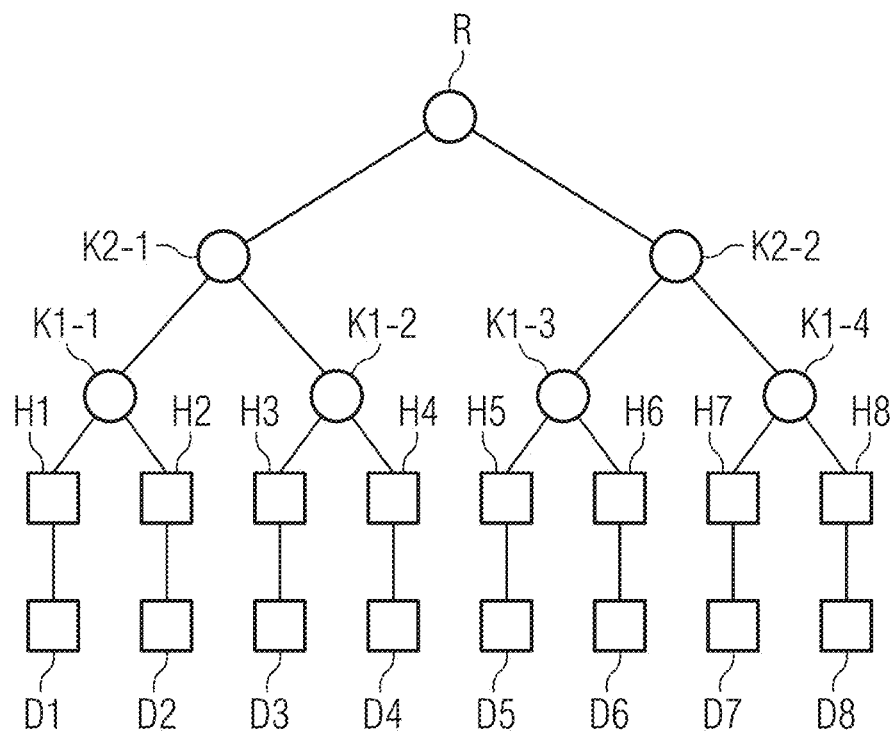
FIG. 1 shows a schematic representation to illustrate the formation of a hash tree according to one embodiment.

FIG. 1 shows a schematic representation to illustrate the formation of a hash tree. The hash tree can be based upon a group of a plurality of data elements D1-D8. The number of eight data elements selected in this embodiment therein serves only as an exemplary instance and does not represent a restriction of the present invention. Rather, a number of data elements Di differing from eight can also be used.

The data elements Di can be, in particular, data elements which represent predetermined information items relating to a user. For example, a first data element D1 can specify the first name of the user, a second data element D2 the surname of the user, a third data element D3 the date of birth, a fourth data element D4 the place of residence or address of the user, a fifth data element D5 the business where the user works, a sixth data element D6 the position of the user in this business and a seventh data element D7, for example, the validity duration of the data set. Furthermore, with the eighth data element D8, an information item can be provided which is suited to checking/validating the identity of the user. A data element with such information is designated a reference data element below.

The reference data element can be, for example, a public key. Via such a public key in the context of a public-private key system, for example, a signature of a user can be checked, which the user has signed with his private key corresponding to the public key. As described in more detail below, a receiver can transfer any arbitrary information, for example, to the user, which the user thereupon signs via his private key and returns it to the receiver. Thereupon, the receiver can check this signature using a public key of the reference data element. Following a successful check of this signature, the receiver can thereupon assume that the further received data elements also belong to this receiver.

The formation of a hash tree for the eight data elements Di set out here will now be described. Herein, a binary hash tree is formed wherein two elements are combined, in each case, to a higher-order node. In principle, however, hash trees are also possible in which more than two elements are combined to a higher-level node.

Initially, for each data element Di, a corresponding hash value Hi can be calculated. For this purpose, in principle, the use of each desired suitable hash algorithm is possible. As hash algorithms, for example, the SHA-2 and SHA-3 families of secure hash algorithm (SHA) or other secure algorithms can be used. The hash value established in this way represents a value with a predefined length, wherein the value is irreversibly calculated from the value of the original data element Di. In this regard, irreversible means that an unambiguous hash value Hi can be calculated from the value of the data element Di, although from this hash value Hi it is no longer possible to deduce the original value of the data element Di.

In the next step, the hash tree can be formed from these calculated hash values Hi. Therein, initially two or more hash values Hi are combined in each case and a common hash value is calculated therefor, which forms the value of a higher-value node K1-$i$. In the next step, the hash values of these nodes K1-$i$ can also be combined into groups and therefrom hash values can be calculated for the nodes K2-$i$ of the next highest level. This method can be continued until finally only a single central hash value is formed. The corresponding node is designated the root node R.

If, apart from the data elements Di, the hash value of the root node R is now also provided to a receiver, then the receiver can create the hash tree in a similar manner and can compare the resulting value of the root node R with the value provided by the user for the root node R. If the two values match, it can be concluded therefrom that the transferred information in the data elements Di is correct.

From the statements above, it can be concluded that for the determination of the value for the root node R, the information must be drawn from all the underlying data elements Di. Accordingly, all this information must therefore be provided to the receiver. If, however, a user does not wish to provide all this information to the receiver, it is also not possible to calculate the hash value for the root node R.

In some scenarios, however, it can be desirable that the user does not wish to transfer all the information of the data elements Di to a particular receiver. For example, it can be sufficient, for checking the age of a user, to transfer the date of birth. Further information such as the place of residence or occupational data should, for example, herein not be transferred. In a further application case, for example, a user wishes only to transfer occupational information such as the business and the position in the business, but not his personal data such as address and/or date of birth.

For applications of this kind, it is possible, rather than the specific information regarding the respective data elements Di, to provide to the receiver the hash values Hi resulting therefrom for these data elements or possibly also the hash values of the nodes Kj-i resulting therefrom. Accordingly, the receiver can determine the value for the root node R from the only partially provided data elements Di and the hash values of the remaining non-transferred data elements or nodes resulting therefrom.

Figure 2:
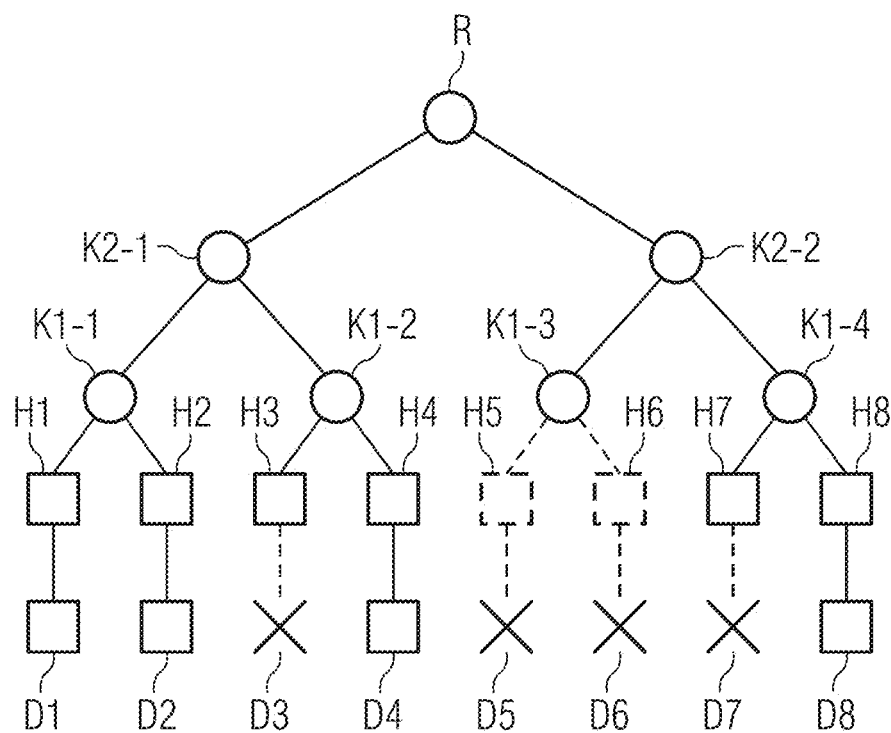
FIG. 2 shows a schematic representation to illustrate the formation of a hash tree according to a further embodiment.

FIG. 2 shows a schematic representation to illustrate the formation of a hash tree in the event that only a subset of the underlying data elements Di are to be provided to a receiver. The data elements D1, D2, D4 and D8 that are to be provided to the receiver are represented here by squares, while the data elements D3, D5, D6, D7 that are not to be provided are represented by crosses.

Next, the formation of the hash tree according to the fundamental principle can be carried out as previously set out in relation to FIG. 1. Subsequently, for the data elements D3, D5, D6, D7 that are not to be transferred, the required hash values are selected.

In the example shown in FIG. 2, therefore, in place of the data elements D3 and D7, the hash values H3 and H7 of these data elements D3 and D7 are transferred. Furthermore, in place of the data elements D5 and D6, the hash value for the node K1-3 can be provided since this hash value provides all the necessary information that is required for forming the hash value for the root node R without having to call upon the data elements D5 and D6.

Regardless of which data elements D1-D7 are conveyed for the transference to a particular receiver and which data elements D1-D7 are replaced with suitable hash values, at least the reference data element D8 which enables a checking/validation of the user is always also transferred. Thus, with only partially transferred user-specific data, the authenticity of the transmitting user can also always be reliably checked.

The information of the data elements Di to be transferred and the hash values Hi of the non-transferred data elements Di and/or of the relevant nodes Kj-i in the hash tree can, in principle, be transferred in any desired manner. For example, the information can be provided and transferred in a standardized format, for example, XML, JSON or suchlike.

Furthermore, is should also be possible, for example, to define a data structure and to provide this specified data structure in advance both to the sender side and also the receiver side. Accordingly, the relevant data can be transferred according to this data structure. Via such a data structure, for example, it is possible to substantiate at which position of the data structure a respective data element and/or a corresponding hash value is placed.

Furthermore, it is also possible, in particular for the transferred hash values of each of the non-transferred data elements Di and/or the node points Kj-i to provide a corresponding information item together with the corresponding hash value, wherein this additional information item specifies the position of the hash value in the hash tree.

In order to further increase the security of the data, it is also possible to modify the data before the calculation of the hash values. In particular, if for example, for the information in a data element, there is only a very limited quantity of alternative information, if relevant by trial-and-error, in particular via a so-called brute force attack, the non-transferred information could be deduced. If, for example, a data element comprises information regarding a month (for example, to specify a date of birth) then only twelve possible alternatives are available for this, which can easily all be tried.

In order to hinder, or at best entirely prevent, such attack attempts, it is also possible to modify the data element before calculating the hash value. For this purpose, for example, a function can be used which determines a modified value from the combination of the original value for the data element Di and a fixed, previously stipulated value dependent upon the position of the respective element in the hash tree. The fixed, previously stipulated values can herein be established in an arbitrary, in particular random, manner. Therein, this stipulated value is to be stored in a safe and trustworthy manner and not revealed openly.

Since, therefore, all the parameters for the calculation in the hash values within the hash tree are known on the user side, these values can be calculated reproducibly. In particular, by this mechanism and/or means, hash values for seemingly random information can also be generated, even if the original underlying information only has a limited value range. By this mechanism and/or means, it is not possible either for the receiver nor a possible attacker who intercepts the values to deduce the original information from the respective hash values by trial-and-error or similar mechanisms and/or means.

Figure 3:
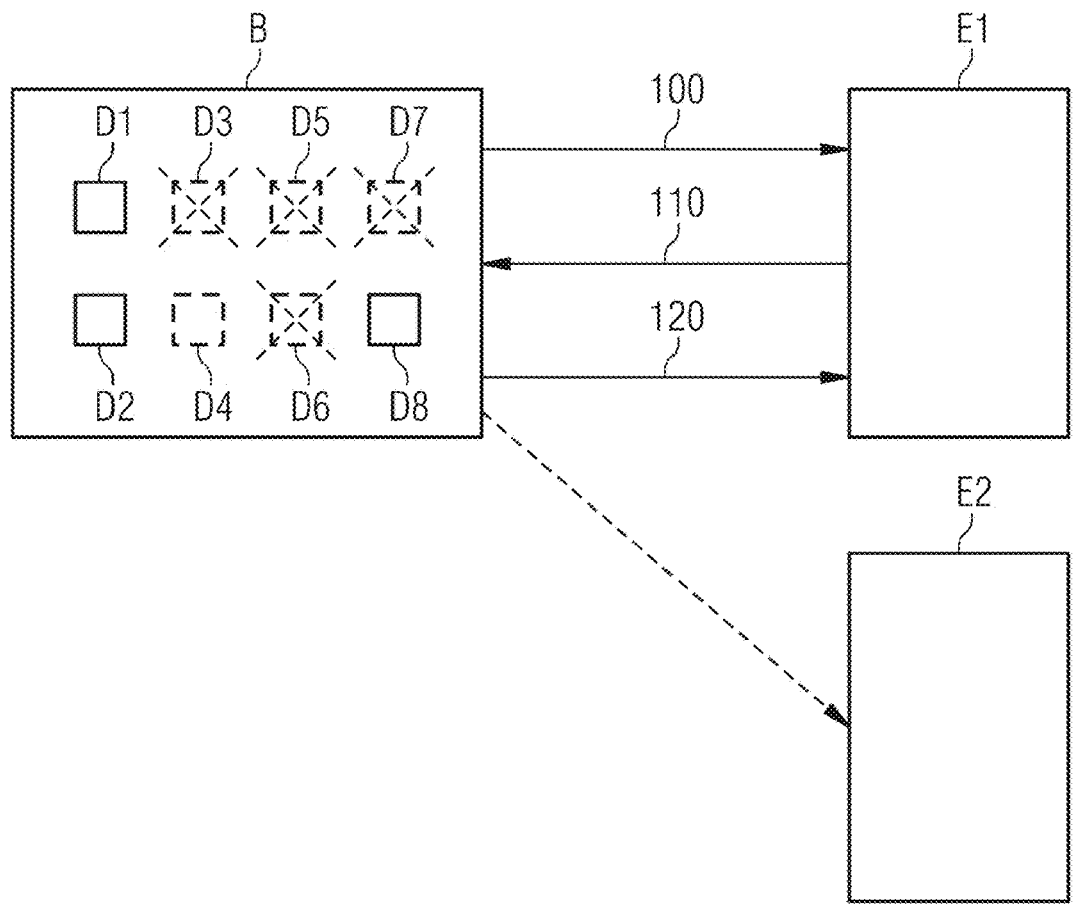
FIG. 3 shows a schematic representation of a schematic diagram to illustrate the data exchange between a user and a receiver according to one embodiment.

FIG. 3 shows a schematic representation to illustrate the data exchange between a user B and a receiver E1. The information characterizing a user can therein have the previously described data elements Di. At this point, it should again be noted that the number of eight data elements and the aforementioned features for these data elements should be understood as merely exemplary and do not represent any restriction of the present invention.

If the user B wishes to share information of a part of these data elements Di with a receiver E1, the user B can select the desired data elements Di in any desired manner. For example, for this purpose, a user interface can be provided in a system which enables the user to select the desired data elements Di. As previously mentioned, the selection of a data element D8 which serves for the verification of the identity of the user B is therein obligatory, i.e. this data element D8 is always transferred. Dependent upon the application case, the remaining data elements D1-D7 can be selected or not.

Once the user has made the selection for the subset of the data elements Di to be transferred, the selected data elements Di together with the required further hash values Hi for non-selected data elements Di and/or hash values of nodes Kj-i are established so that, on the basis of this data, it is possible for the receiver E1 to determine the hash values for the root node R of the hash tree. The required information, i.e. the selected data elements Di, the further hash values and the hash values of the root node R are then provided to the receiver E1 in step 100.

For further checking of the authenticity of the user B, the receiver E1 generates an item of information. For example, for this purpose, a random value can be generated. This information item is transferred to the user in step 110. Thereupon, the user signs this information via a private key which corresponds to the reference data element D8. The information signed in this way, in particular the signature, is then transferred to the receiver E1 in step 120. Subsequently, the receiver E1 can check this signature using the information in the reference data element D8 in order to confirm the authenticity of the user B.

If the user B also enters into contact with a further receiver E2, then the user B for this further receiver E2 can again individually select a part of the data elements D1-D7 which are to be transferred similarly to this further receiver E2. This further receiver E2 can herein also check the authenticity of the user making use of the information in the reference data element D8.

Figure 4:
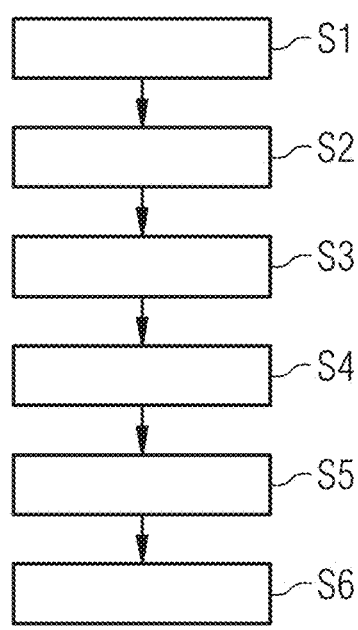
FIG. 4 shows a flow diagram illustrating a method for providing data elements according to one embodiment.

FIG. 4 shows a flow diagram illustrating the principle underlying a method for trustworthy provision of data elements according to one embodiment. The method can, in principle, comprise any desired steps as described above in relation to the embodiments of FIGS. 1 to 3. Similarly, the embodiment already described can also comprise arbitrary steps, as can be required in association with the method described below.

In step S1, initially a provision of a plurality of data elements Di takes place. These plurality of data elements Di comprise at least one reference data element D8 as described above. This reference data element is suitable for validating the identity of the user.

In step S2, the calculation of hash values Hi for the data elements Di provided takes place. For this purpose, as described above, any desired hash algorithm can be used.

In step S3, a hash tree is created. The calculated hash values Hi of the data elements Di provided therein form the leaves of the hash tree.

In step S4, a subset of the data elements Di provided can be selected. However, this subset comprises at least the reference data element D8.

In step S5, a dataset is created which comprises the selected data elements, the hash value of the root of the hash tree and further hash values which have been formed from the non-selected data elements.

This dataset can be output in step S6.

An apparatus for trustworthy provision of data elements can be configured to execute the previously described method for trustworthy provision of data elements. The apparatus is configured to execute this method and its aspects by the interface and the computation unit being configured to execute the corresponding method steps. In particular, the interface can comprise one or more sub-interfaces. In particular, the computation unit can comprise one or more computation sub-units.

Figure 5:
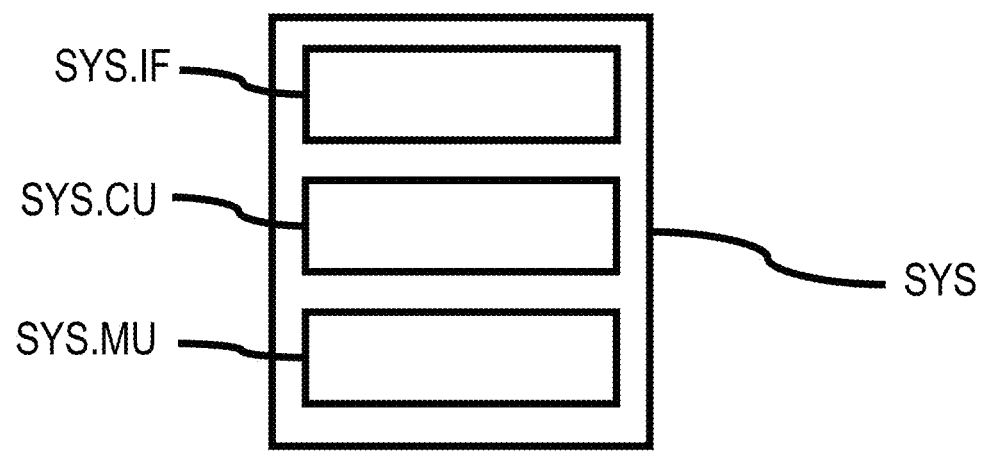
FIG. 5 displays an apparatus for trustworthy provision of data elements.

FIG. 5 displays an apparatus for trustworthy provision of data elements SYS. The displayed apparatus SYS is configured to execute a method according to the invention for trustworthy provision of data elements. The apparatus SYS comprises an interface SYS.IF, a computation unit SYS.CU, and a memory unit (or memory store) SYS.MU.

The apparatus SYS can in particular be a computer, a microcontroller or an integrated circuit. Alternatively, the apparatus SYS can be a real or a virtual network of computers (a technical term for a real network is "cluster", a technical term for a virtual network is "cloud"). The apparatus SYS can also be designed as virtual system that is executed on a computer, a real network of computers or a virtual network of computers (a technical term is "virtualization").

An interface SYS.IF can be a hardware or software interface (for example PCI bus, USB or Firewire). A computation unit SYS.CU can have hardware elements or software elements, for example a microprocessor or a so-called FPGA (acronym for "field programmable gate way"). A memory unit SYS.MU can be implemented as a non-permanent working memory (random access memory, RAM for short) or as a permanent mass storage device (hard disk, USB stick, SD card, solid state disk).

The interface SYS.IF can in particular comprise a plurality of sub-interfaces which carry out different steps of the respective method. In other words, the interface SYS.IF can also be understood as a plurality of interfaces SYS.IF. The computation unit SYS.CU can in particular comprise a plurality of sub-computing units which carry out different steps of the respective method. In other words, the computation unit SYS.CU can also be understood as a plurality of computation units SYS.CU.

Summarizing, embodiments of the present invention relates to the transference of user-specific data that can be validated via a hash tree. If, herein, not all the underlying data of the hash tree is transferred, then in place of the non-transferred data, a suitable hash value can be transferred from the hash tree. The data to be transferred herein comprises at least one reference data element which is suitable for checking the authenticity of the sender.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "on," "connected," "engaged," "interfaced," and "coupled." Unless explicitly described as being "direct," when a relationship between first and second elements is described in the disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" on, connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

It is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed above. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments. The present invention may, however, be embodied in many alternate forms and should not be construed as limited to only the embodiments set forth herein.

In addition, or alternative, to that discussed above, units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one example embodiment relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

What is claimed is:

1. A method for trustworthy provision of data elements, the method comprising:

calculating first hash values for a plurality of data elements, the plurality of data elements including at least one reference data element for validating an identity of a user;

creating a hash tree including a root and leaves, the first hash values corresponding to the leaves of the hash tree;

selecting a first subset of the plurality of data elements to obtain a second subset of the plurality of data elements, the first subset including the at least one reference data element, and the second subset including data elements among the plurality of data elements not selected by the selecting;

creating a dataset including the first subset, a hash value of the root and second hash values, the second hash values being among the first hash values, and the second hash values being calculated for the second subset; and outputting the dataset.

2. The method as claimed in claim 1, wherein the at least one reference data element comprises a public key of the user.

3. The method as claimed in claim 2, wherein the dataset indicates positions of the second hash values in the hash tree.

4. The method as claimed in claim 3, wherein the calculating the first hash values comprises:
determining a modification value for a node of the hash tree, the modification value depending upon a position of the node and a previously stipulated value;
modifying a value of the node using an original node value and the modification value to obtain a modified value; and
calculating a hash value for the modified value.

5. The method as claimed in claim 2, wherein the calculating of the first hash values comprises:
determining a modification value for a node of the hash tree, the modification value depending upon a position of the node and a previously stipulated value;
modifying a value of the node using an original node value and the modification value to obtain a modified value; and
calculating a hash value for the modified value.

6. The method as claimed in claim 1, wherein the dataset indicates positions of the second hash values in the hash tree.

7. The method as claimed in claim 6, wherein the outputting the dataset outputs the dataset in a data structure specifying the positions of the second hash values in the hash tree.

8. The method as claimed in claim 6, wherein the hash tree is a binary tree.

9. The method as claimed in claim 6, wherein the calculating the first hash values comprises:
determining a modification value for a node of the hash tree, the modification value depending upon a position of the node and a previously stipulated value;
modifying a value of the node using an original node value and the modification value to obtain a modified value; and
calculating a hash value for the modified value.

10. The method as claimed in claim 1, wherein the outputting the dataset outputs the dataset in a data structure specifying positions of the second hash values in the hash tree.

11. The method as claimed in claim 10, wherein the calculating the first hash values for the plurality of data elements comprises:
determining a modification value for a node of the hash tree, the modification value depending upon a position of the node and a previously stipulated value;
modifying a value of the node using an original node value and the modification value to obtain a modified value; and
calculating a hash value for the modified value.

12. The method as claimed in claim 1, wherein the dataset is output in an XML or JSON format.

13. The method as claimed in claim 1, wherein the hash tree is a binary tree.

14. The method as claimed in claim 1, wherein the calculating the first hash values comprises:
determining a modification value for a node of the hash tree, the modification value depending on a position of the node and a previously stipulated value;
modifying a value of the node using an original node value and the modification value to obtain a modified value; and
calculating a hash value for the modified value.

15. The method as claimed in claim 14, wherein the previously stipulated value is based on a receiver to which the dataset is output by the outputting.

16. A non-transitory computer-readable medium storing instructions that, when executed by a computer or an apparatus, cause the computer or the apparatus to execute the method as claimed in claim 1.

17. An apparatus for trustworthy provision of data elements, the apparatus comprising:
a memory store storing a plurality of data elements, the plurality of data elements including at least one reference data element for validating an identity of a user; and
at least one processor configured to execute computer-readable instructions to cause the apparatus to
calculate first hash values for the plurality of data elements,
create a hash tree including a root and leaves, the first hash values corresponding to the leaves of the hash tree,
select a first subset of the plurality of data elements to obtain a second subset of the plurality of data elements, the first subset including the at least one reference data element, and the second subset including data elements among the plurality of data elements not selected by the selecting,
create a dataset including the first subset, a hash value of the and second hash values, the second hash values being among the first hash values, and the second hash values being calculated for the second subset, and
output the dataset.

18. The apparatus as claimed in claim 17, further comprising:
a selecting device configured to
receive input for selecting the first subset and
select the first subset according to the input.

* * * * *